United States Patent
Han

(10) Patent No.: US 9,344,163 B2
(45) Date of Patent: May 17, 2016

(54) METHOD AND TERMINAL FOR IMPLEMENTING MULTI-ANTENNA TRANSMISSION

(71) Applicant: Huawei Technologies Co., Ltd., Shenzhen, Guangdong (CN)

(72) Inventor: Lei Han, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/938,920

(22) Filed: Jul. 10, 2013

(65) Prior Publication Data

US 2014/0044207 A1     Feb. 13, 2014

(30) Foreign Application Priority Data

Aug. 8, 2012    (CN) .......................... 2012 1 0280446

(51) Int. Cl.
| | |
|---|---|
| H04B 7/04 | (2006.01) |
| H04B 7/10 | (2006.01) |
| H04B 7/06 | (2006.01) |

(52) U.S. Cl.
CPC ............ *H04B 7/0413* (2013.01); *H04B 7/0689* (2013.01); *H04B 7/0691* (2013.01); *H04B 7/0404* (2013.01); *H04B 7/0417* (2013.01); *H04B 7/063* (2013.01); *H04B 7/0617* (2013.01); *H04B 7/10* (2013.01)

(58) Field of Classification Search
CPC ...... H04B 7/0691; H04B 7/10; H04B 7/0413; H04B 7/0417
See application file for complete search history.

(56) References Cited

U.S. PATENT DOCUMENTS

| | | | |
|---|---|---|---|
| 2002/0132600 A1* | 9/2002 | Rudrapatna ................. | 455/277.1 |
| 2005/0117520 A1* | 6/2005 | Miyoshi ........................ | 370/238 |
| 2005/0192019 A1 | 9/2005 | Kim et al. | |
| 2007/0049347 A1* | 3/2007 | Jin et al. ...................... | 455/562.1 |
| 2008/0240276 A1 | 10/2008 | Song et al. | |
| 2011/0216846 A1* | 9/2011 | Lee et al. ...................... | 375/295 |
| 2012/0275531 A1 | 11/2012 | Wu et al. | |
| 2013/0315337 A1 | 11/2013 | Dai et al. | |
| 2014/0119223 A1* | 5/2014 | Song et al. .................... | 370/252 |

FOREIGN PATENT DOCUMENTS

| | | |
|---|---|---|
| CN | 102104406 A | 6/2011 |
| CN | 102111246 A | 6/2011 |
| CN | 102122976 A | 7/2011 |
| KR | 20050082153 A | 8/2005 |
| KR | 20060047015 A | 5/2006 |

\* cited by examiner

*Primary Examiner* — Ross Varndell
(74) *Attorney, Agent, or Firm* — Leydig, Voit & Mayer, Ltd.

(57) ABSTRACT

Embodiments of the present invention disclose a method and a terminal for implementing multi-antenna transmission. The method includes: setting a group of low-correlation antennas and a group of high-correlation antennas, where the correlation between antennas in the group of low-correlation antennas is lower than the correlation between antennas in the group of high-correlation antennas; receiving a response message carrying a transfer mode switching instruction fed back by an evolved NodeB; and extracting the transfer mode switching instruction from the response message fed back by the evolved NodeB; if the transfer mode switching instruction is corresponding to a first transfer mode, switching to the group of low-correlation antennas to transmit signals; and if the transfer mode switching instruction is corresponding to a second transfer mode, switching to the group of high-correlation antennas to transmit signals.

8 Claims, 4 Drawing Sheets

METHOD AND TERMINAL FOR IMPLEMENTING MULTI-ANTENNA TRANSMISSION

CROSS-REFERENCE TO RELATED APPLICATIONS

This application claims priority to Chinese Patent Application No. 201210280446.5, filed on Aug. 8, 2012, which is hereby incorporated by reference in its entirety.

TECHNICAL FIELD

The present invention relates to the field of communication technologies, and in particular, to a method and a terminal for implementing multi-antenna transmission.

BACKGROUND

MIMO (Multiple Input Multiple Output, multiple input multiple output antenna system) and Beam forming (beamforming) technologies are widely applied in current wireless high speed communication systems. Especially, a 3GPP LTE (Long Term Evolution, long term evolution) system requires all LTE UEs (User Equipment, user equipment) to support the MIMO technology, and meanwhile a TDD (Time Division Duplexing, time division duplexing) mode of the LTE requires the UE to support the Beam forming technology.

The MIMO is a multi-antenna technology in the wireless communication system, which mainly uses a plurality of antennas at a transmitting end to individually send signals independently, and meanwhile uses a plurality of antennas at a receiving end to receive information, thereby effectively enhancing spectrum efficiency of the wireless communication system, so as to greatly increase system capacity and possible transmission distance. With regard to the MIMO technology, obtaining a diversity gain or a multiplexing capacity by means of non-correlation is a critical way to enhance the system capacity. Therefore, as for the UE the correlation between antennas needs to be reduced as much as possible, so that mutual impact between spatially parallel sub-channels becomes smaller. In this way, in the transmit diversity technology, it is more convenient to obtain a diversity gain; and in the spatial multiplexing technology, it is more convenient to obtain a multiplexing capacity.

The Beam forming technology is another multi-antenna technology, the principle of which lies in using high correlation of spatial channels to implement beamforming, so as to enhance signal-to-noise ratio, and increase system capacity or coverage scope. With regard to the TDD mode of the LTE, an eNB (evolved NodeB) makes a downlink channel evaluation mainly by using channel interchangeability according to a pilot frequency sent by a user end, so as to implement the beamforming.

However, the current LTE UE generally supports using one antenna for transmission and two antennas for reception, that is, the so-called manner of one for transmission and two for reception; meanwhile, the optimal performance of the MIMO is required. Therefore, orthogonal polarization and the like are adopted to reduce the correlation between two receive antennas as much as possible, so as to obtain higher diversity gain and multiplexing capacity. However, the UE in the TDD mode of the LTE must support the Beam forming technology, the evolved NodeB in the TDD system utilizes the interchangeability between uplink and downlink channels to make the beamforming, and since the UE usually adopts a manner of uplink single transmit antenna, that is, the beamforming is made with respect to the single transmit antenna. Thereby, the gain brought by a low antenna correlation satisfying the MIMO optimal performance is lower than the gain brought by a high antenna correlation, and such a low antenna correlation may obviously affect the gain of the Beam forming, thereby affecting the cell coverage scope and system capacity.

SUMMARY

Embodiments of the present invention provide a method and a terminal for implementing multi-antenna transmission, which can ensure an optimal effect of the MIMO without affecting the gain of Beam forming, thereby enhancing cell coverage scope and system capacity.

In order to solve the above problem, the embodiments of the present invention provide the following technical solutions:

In one aspect, a possible solution of a method for implementing multi-antenna transmission according to the present invention includes:

setting a group of low-correlation antennas and a group of high-correlation antennas, where the correlation between antennas in the group of low-correlation antennas is lower than the correlation between antennas in the group of high-correlation antennas; receiving a response message carrying a transfer mode switching instruction fed back by an evolved NodeB; and extracting the transfer mode switching instruction from the response message; if the transfer mode switching instruction is corresponding to a first transfer mode, switching to the group of low-correlation antennas to transmit signals; and if the transfer mode switching instruction is corresponding to a second transfer mode, switching to the group of high-correlation antennas to transmit signals.

Preferably, before the receiving the response message carrying the transfer mode switching instruction fed back by the evolved NodeB, the method further includes: reporting a reference signal to the evolved NodeB, where the reference signal is used by the evolved NodeB to determine a transfer mode.

Preferably, the antennas in the group of low-correlation antennas are different from the antennas in the group of high-correlation antennas.

Preferably, the group of low-correlation antennas and the group of high-correlation antennas share at least one antenna.

Preferably, the antennas in the group of low-correlation antennas adopt orthogonal polarization.

Preferably, the antennas in the group of high-correlation antennas adopt vertical polarization.

In another aspect, a possible solution of a terminal for implementing multi-antenna transmission according to the present invention includes: a plurality of antennas, a receiving unit, and a switching unit; where the plurality of antennas is divided into at least a group of low-correlation antennas and a group of high-correlation antennas, and the correlation between antennas in the group of low-correlation antennas is lower than the correlation between antennas in the group of high-correlation antennas; the receiving unit receives a response message carrying a transfer mode switching instruction fed back by an evolved NodeB; and the switching unit is configured to: extract the transfer mode switching instruction from the response message received by the receiving unit; if the transfer mode switching instruction is corresponding to a first transfer mode, switch to the group of low-correlation antennas to transmit signals; and if the transfer mode switching instruction is corresponding to a second transfer mode, switch to the group of high-correlation antennas to transmit signals.

Preferably, the terminal further includes: a reporting unit, configured to report, before the receiving unit receives the response message carrying the transfer mode switching instruction fed back by the evolved NodeB, a reference signal to the evolved NodeB, where the reference signal is used by the evolved NodeB to determine a transfer mode.

Preferably, the antennas in the group of low-correlation antennas are different from the antennas in the group of high-correlation antennas.

Preferably, the group of low-correlation antennas and the group of high-correlation antennas share at least one antenna.

Preferably, the group of low-correlation antennas includes at least two antennas, and the at least two antennas adopt orthogonal polarization.

Preferably, the group of high-correlation antennas includes at least two antennas, and the at least two antennas adopt vertical polarization.

It can be seen that, by adopting the method and the terminal according to the embodiments of the present invention, that is, by setting groups of antennas with both low correlation and high correlation and selecting a corresponding group of antennas to transmit signals according to the transfer mode fed back by the eNB, an optimal effect of the MIMO can be ensured without affecting the gain of Beam forming in a system where the MIMO and the Beam forming coexist, thereby enhancing cell coverage scope and system capacity.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following descriptions show merely some embodiments of the present invention, and persons of ordinary skill in the art may still derive other drawings from the accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The basic idea of the embodiments of the present invention lies in setting groups of antennas with both low correlation and high correlation and selecting a corresponding group of antennas to transmit signals according to a transfer mode fed back by an eNB, so as to ensure an optimal effect without affecting the gain of Beam forming in a system where the MIMO and the Beam forming coexist.

Figure 1:
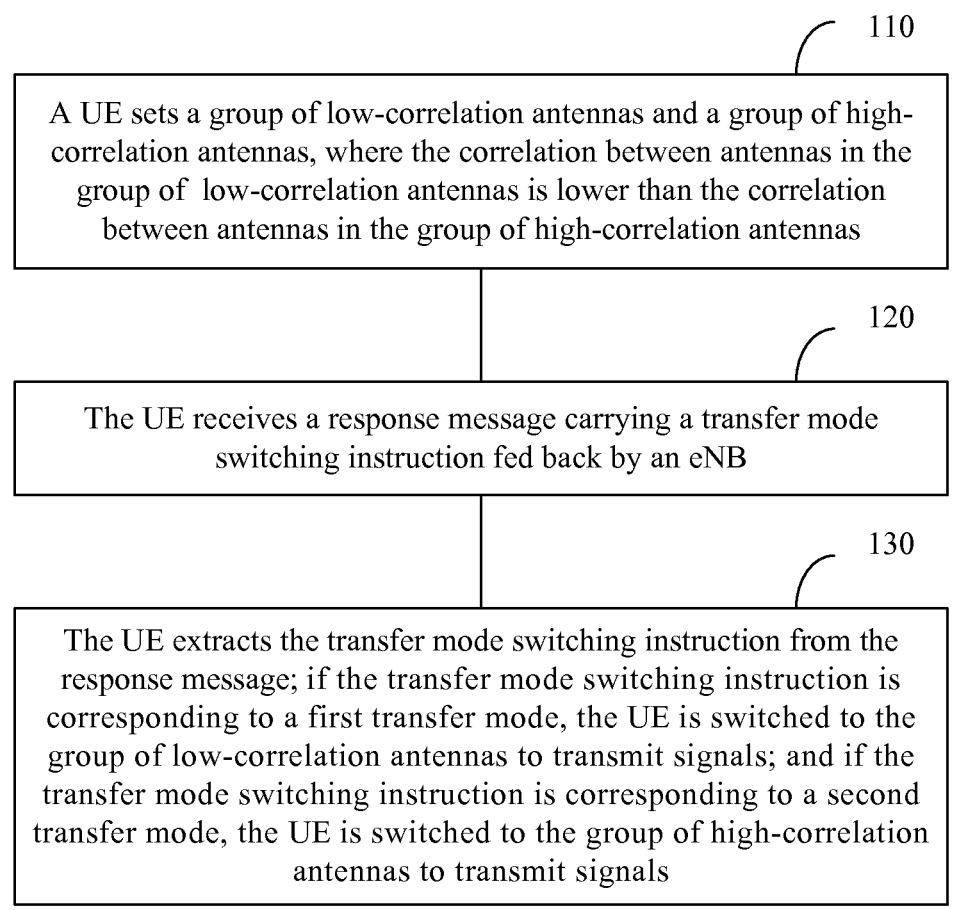
FIG. 1 is a schematic flowchart of a method for implementing multi-antenna transmission according to an embodiment of the present invention.

One embodiment of the present invention provides a method for implementing multi-antenna transmission, and as shown in FIG. 1, the method includes:

Step 110: A UE sets a group of low-correlation antennas and a group of high-correlation antennas, where the correlation between antennas in the group of low-correlation antennas is lower than the correlation between antennas in the group of high-correlation antennas.

Specifically, in order to satisfy the low antenna correction required by the MIMO technology and the high antenna correction required by the Beam forming technology, this embodiment proposes setting a set of groups of antennas, where the set of groups of antennas includes a group of low-correlation antennas and a group of high-correlation antennas. This embodiment may adopt, but is not limited to, the following manner to perform setting.

First, the UE, for example supporting one for transmitting and two for receiving, sets that the antennas in the group of low-correlation antennas are different from the antennas in the group of high-correlation antennas: that is, sets two independent group of antennas respectively in the principle of low correlation and high correlation; where one group of antennas may obtain the low correlation between the antennas in the group of antennas by means of orthogonal polarization or in other manners, and the other group of antennas may obtain the high correlation between antennas in the group of antennas by means of vertical polarization or in other manners, which is not repeated herein in detail.

Second, by using the UE supporting one for transmitting and two for receiving as an example, the group of low-correlation antennas and the group of high-correlation antennas are set to share at least one antenna: setting a group of antennas at least including 3 antennas, where a group of a first antenna and a second antenna in the group of antennas should satisfy the requirement of low correlation, and a group of the first antenna and a third antenna should satisfy the requirement of high correlation.

It should be noted that, persons of ordinary skill in the art can easily understand that, the first antenna, the second antenna, and the third antenna mentioned in this embodiment do not have any sequential relationship, and have the same function when transmitting signals individually. These three antennas are merely used to distinguish different groups, which are not repeated herein in this embodiment.

Step 120: The UE receives a response message carrying a transfer mode switching instruction fed back by an eNB;

When determining the transfer mode to which the UE needs to continue being switched, the eNB feeds back the response message such as an air interface signaling to the UE, and the response message carries an instruction indicating the transfer mode to which the UE needs to be switched; it should be noted that, the transfer mode fed back by the eNB in this embodiment should at least include a transfer mode satisfying the MIMO performance requirement and a transfer mode satisfying the Beam forming requirement.

Step 130: The UE extracts the transfer mode switching instruction from the response message fed back by the eNB; if the transfer mode switching instruction is corresponding to a first transfer mode, the UE is switched to the group of low-correlation antennas to transmit signals; and if the transfer mode switching instruction is corresponding to a second transfer mode, the UE is switched to the group of high-correlation antennas to transmit signals.

When receiving the air interface signaling fed back by the eNB, the UE extracts from the air interface signaling the transfer mode serving as the basis to transmit signals, and then determines the group of antennas to transmit signals according to the transfer mode; specifically, when the transfer mode is a MIMO mode, the UE needs to be switched to the group of antennas satisfying the low correlation requirement; and when the transfer mode is a Beam forming mode, the UE needs to be switched to the group of antennas satisfying the high correlation requirement to transmit signals, which are not repeated in detail in this embodiment.

Moreover, it should be noted that, before the receiving, by the UE, the response message carrying the transfer mode switching instruction fed back by the eNB, the method for implementing multi-antenna transmission according to this embodiment further includes:

Step 140: The UE reports a reference signal to the eNB, where the reference signal is used by the eNB to determine a transfer mode. After receiving the reference signal reported by the UE, the eNB determines the transfer mode to which the UE needs to be switched according to the reference signal. It should be noted that, in this embodiment, the determining, by the eNB, the transfer mode according to the reference signal may be implemented in a manner in the prior art, which is not specifically limited in this embodiment.

Figure 2:
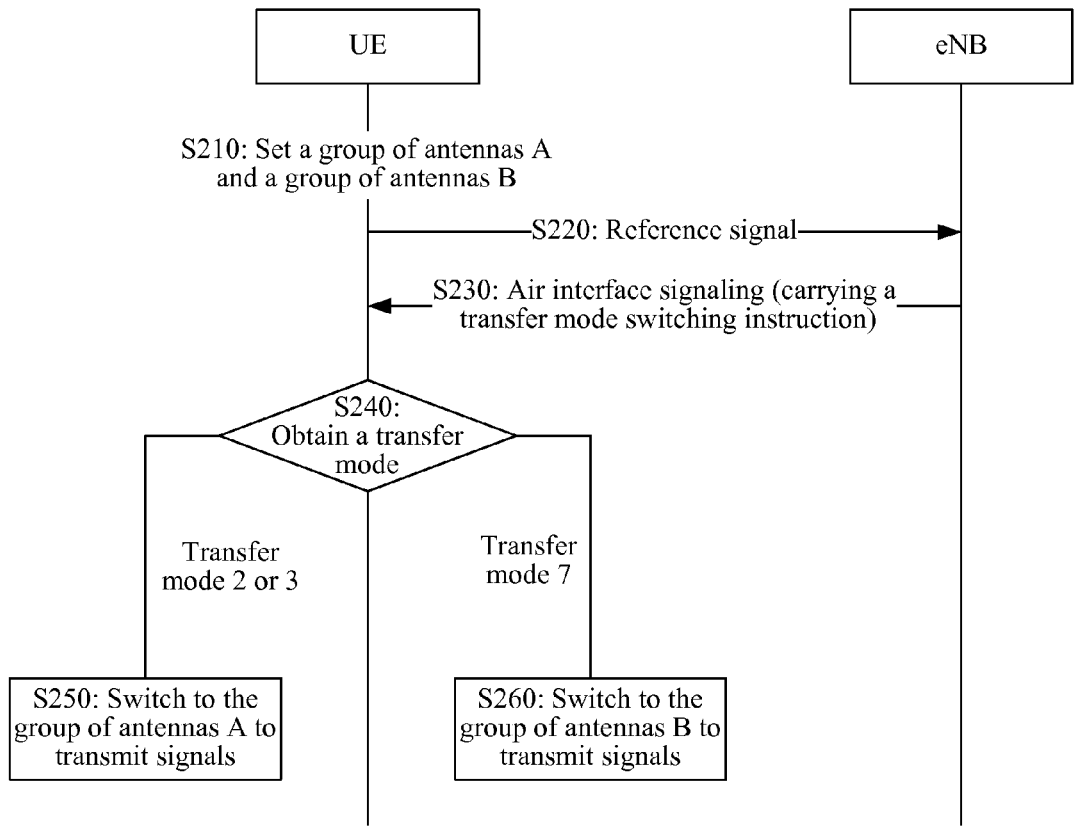
FIG. 2 is another schematic flowchart of the method for implementing multi-antenna transmission according to an embodiment of the present invention.
Figure 3:
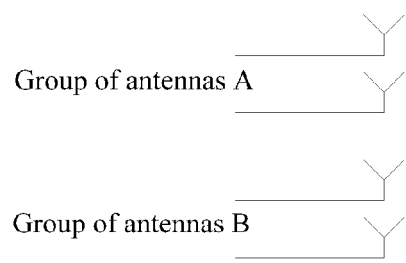
FIG. 3 is a schematic diagram of setting a group of antennas in the method for implementing multi-antenna transmission according to an embodiment of the present invention.

Hereinafter, the method for implementing multi-antenna transmission in the above embodiment is described in detail with a specific example; as shown in FIG. 2, the method includes:

S210: The UE sets a group of antennas A and a group of antennas B, as shown in FIG. 3; the low correlation requirement is satisfied between the antennas included in the group of antennas A, and the high correlation requirement is satisfied between the antennas included in the group of antennas B.

S220: The UE reports a reference signal to the eNB.

S230: After receiving the reference signal reported by the UE, the eNB determines the transfer mode to which the UE needs to be switched according to the reference signal, and feeds back the transfer mode to the UE through an air interface signaling.

S240: After receiving the air interface signaling carrying the transfer mode, the UE obtains the transfer mode.

S250: When a transfer mode 2 or a transfer mode 3 (MIMO) is obtained, the UE is switched to the group of antennas A to transmit signals.

S260: When a transfer mode 7 (Beam forming) is obtained, the UE is switched to the group of antennas B to transmit signals.

Figure 4:
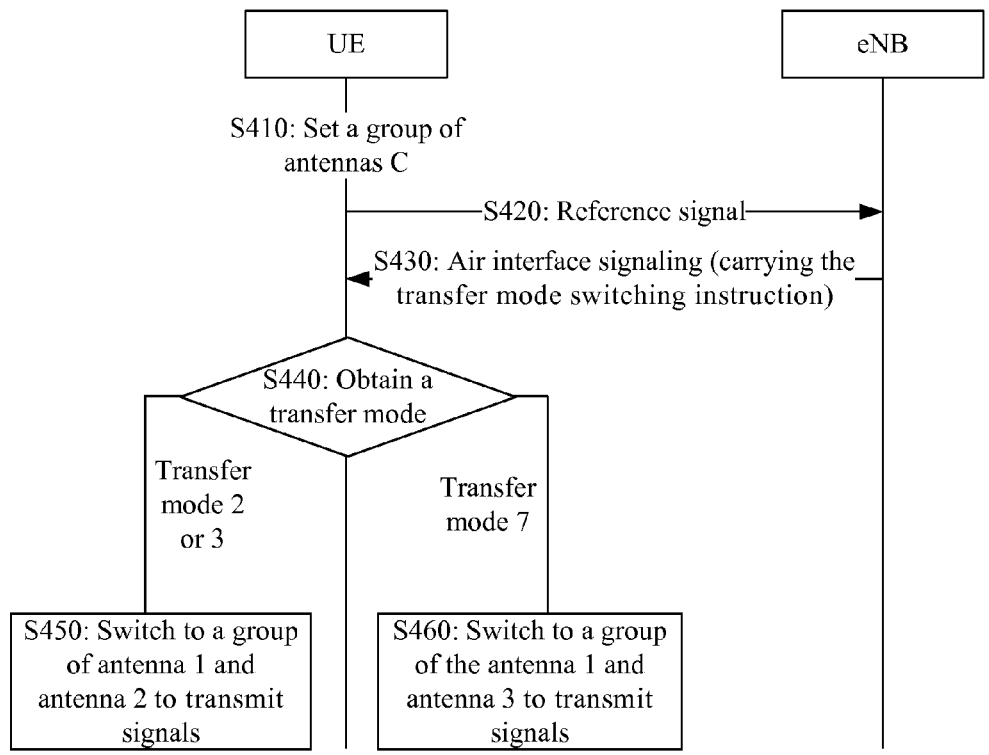
FIG. 4 is still another schematic flowchart of the method for implementing multi-antenna transmission according to an embodiment of the present invention.
Figure 5:
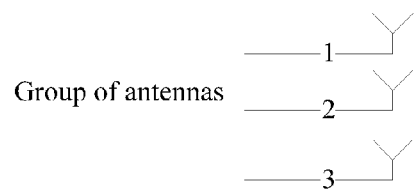
FIG. 5 is another schematic diagram of setting a group of antennas in the method for implementing multi-antenna transmission according to an embodiment of the present invention.

Hereinafter, the method for implementing multi-antenna transmission in the above embodiment is described in detail with another specific example; as shown in FIG. 4, the method includes:

S410: The UE sets a group of antennas C at least including three antennas, as shown in FIG. 5; in the group of antennas C, the group of antenna 1 and antenna 2 satisfies the low correlation requirement of antenna, and the group of the antenna 1 and antenna 3 satisfies the high correlation requirement of antenna.

S420: The UE reports a reference signal to the eNB.

S430: After receiving the reference signal reported by the UE, the eNB determines the transfer mode to which the UE needs to be switched according to the reference signal, and feeds back the transfer mode to the UE through an air interface signaling.

S440: After receiving the air interface signaling carrying the transfer mode, the UE obtains the transfer mode.

S450: When a transfer mode 2 or a transfer mode 3 (MIMO) is obtained, the UE is switched to the group of the antenna 1 and the antenna 2 to transmit signals.

S460: When a transfer mode 7 (Beam forming) is obtained, the UE is switched to the group of the antenna 1 and the antenna 3 to transmit signals.

It can be seen that, by adopting the method of the embodiment of the present invention, that is, by setting groups of antennas with both low correlation and high correlation and selecting a corresponding group of antennas to transmit signals according to the transfer mode fed back by the eNB, an optimal effect of the MIMO can be ensured without affecting the gain of Beam forming in a system where the MIMO and the Beam forming coexist.

Figure 6:
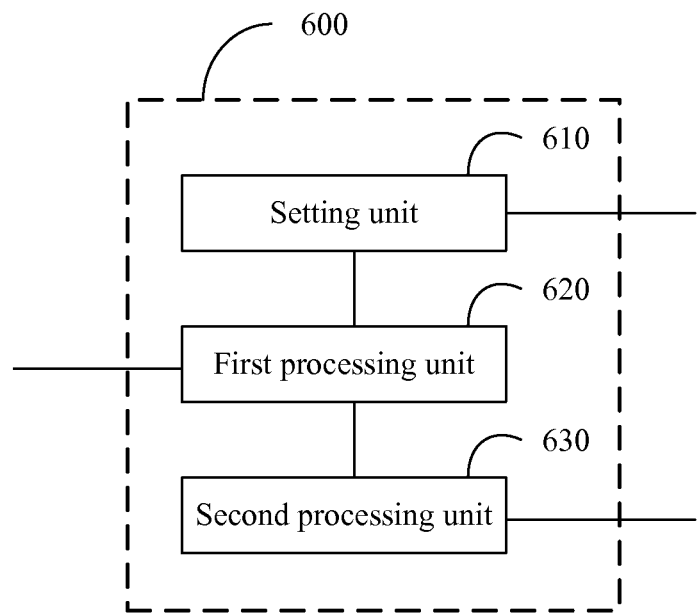
FIG. 6 is a schematic structural diagram of an apparatus for implementing multi-antenna transmission according to an embodiment of the present invention.

Based on the same idea as the above, another embodiment of the present invention also proposes an apparatus for implementing multi-antenna transmission, as shown in FIG. 6. The apparatus 600 includes: a setting unit 610, a first processing unit 620, and a second processing unit 630.

The setting unit 610 is configured to set a group of antennas where the low correlation and the high correlation coexist. The first processing unit 620 is configured to report a reference signal to an evolved NodeB, and receive a response message carrying a transfer mode switching instruction fed back by the evolved NodeB. The second processing unit 630 is configured to: extract the transfer mode switching instruction from the response message received by the first processing unit 620; if it is a first transfer mode, switch to the group of low-correlation antennas to transmit signals; and if it is a second transfer mode, switch to the group of high-correlation antennas to transmit signals.

It should be noted that, persons skilled in the art can easily understand, the apparatus for implementing multi-antenna transmission described in the above embodiment may also exist as a part of a terminal, and the aspect thereof for implementing signal transmission in the terminal is consistent with the description in the above embodiment, so the terminal including the apparatus for implementing multi-antenna transmission in the above embodiment should also be covered in the protection scope of the present application, which is not repeated herein.

Figure 7:
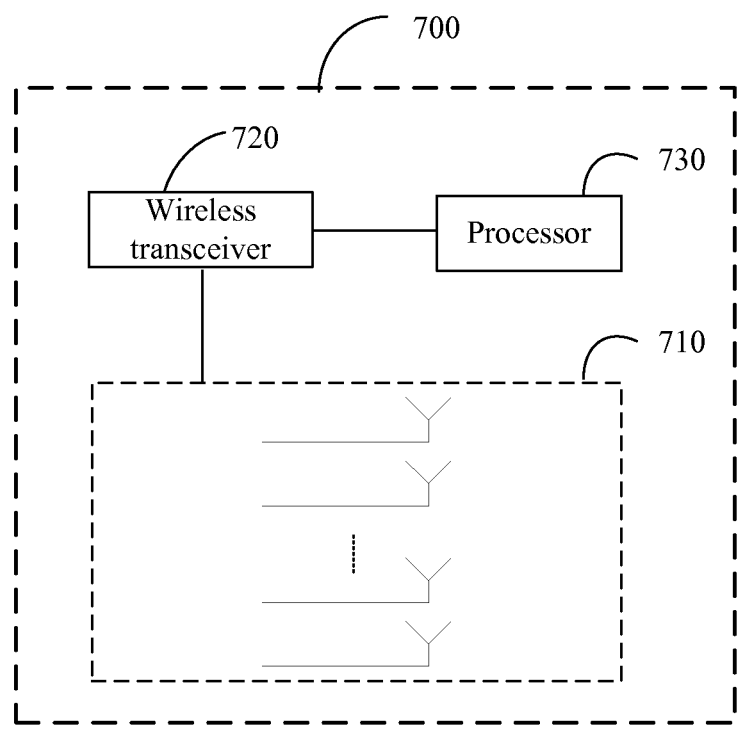
FIG. 7 is a schematic structural diagram of a terminal for implementing multi-antenna transmission according to an embodiment of the present invention.

Furthermore, another embodiment of the present invention further proposes a terminal for implementing multi-antenna transmission. As shown in FIG. 7, the terminal 700 includes: a plurality of antennas 710, a receiving unit 720, and a switching unit 730. The receiving unit 720 may be a wireless transceiver (Transceiver), and the switching unit 730 may be a processor (Processor) which can be implemented by using an integrated circuit technology.

The plurality of antennas 710 is divided into at least a group of low-correlation antennas and a group of high-correlation antennas, where the correlation between antennas in the group of low-correlation antennas is lower than the correlation between antennas in the group of high-correlation antennas; the receiving unit 720 is configured to receive a response message carrying a transfer mode switching instruction fed back by an evolved NodeB; the switching unit 730 is configured to: extract the transfer mode switching instruction from the response message received by the receiving unit 720; if the transfer mode switching instruction is corresponding to a first transfer mode, switch to the group of low-correlation antennas to transmit signals; and if the transfer mode switching instruction is corresponding to a second transfer mode, switch to the group of high-correlation antennas to transmit signals.

Preferably, the UE supporting one for transmitting and two for receiving is taken as an example: the plurality of antennas 710 is divided into at least a group of low-correlation antennas and a group of high-correlation antennas, where the antennas in the group of low-correlation antennas are different from the antennas in the group of high-correlation antennas; that is, each antenna in the group of low-correlation antennas is independent of each antenna in the group of high-correlation antennas, the low correlation between the antennas in the group of low-correlation antennas is obtained by means of orthogonal polarization between the antennas in the group of low-correlation antennas or in other manners, and the high correlation between the antennas in the group of high-correlation antennas is obtained by means of vertical polarization between the antennas in the group of high-correlation antennas or in other manners.

Moreover, the group of low-correlation antennas and the group of high-correlation antennas may share a part of antennas. For example, a group of antennas including at least three antennas is set, where a group of a first antenna and a second antenna in the group of antennas is the group of low-correlation antennas, and a group of the first antenna and a third antenna is the group of high-correlation antennas, which is not repeated specifically in this embodiment.

Furthermore, the terminal 700 for implementing multi-antenna transmission in this embodiment may further include (not shown in the drawings): a reporting unit 740, configured to report a reference signal to an evolved NodeB before the receiving unit 720 receives the response message carrying the transfer mode switching instruction fed back by the evolved NodeB, and the reference signal is used by the evolved NodeB to determine the transfer mode.

Persons skilled in the art may further realize that, units and algorithm steps in each example described with reference to the embodiments disclosed herein can be implemented by electronic hardware, computer software, or a combination thereof. In order to clearly illustrate the interchangeability between the hardware and the software, the composition and steps in each example are generally described in the above description according to the functions thereof. Whether the functions are implemented by the hardware or the software depends upon specific applications and design constraint conditions of the technical solution. Persons skilled in the art may use different methods for each specific application to fulfill the functions described, but such an implementation should not be deemed as going beyond the scope of the embodiments of the present invention.

The units and algorithm steps described with reference to the embodiments disclosed herein can be implemented directly by the hardware, software modules executed by the processor, or a combination thereof.

The above descriptions on the embodiments disclosed enable persons skilled in the art to implement or utilize the embodiments of the present invention. Various modifications to these embodiments are obvious to persons skilled in the art, and the general principles defined herein can be implemented in other embodiments without departing from the spirit or scope of the embodiments of the present invention. Therefore, the embodiments of the present invention will not be limited to these embodiments illustrated herein, but conform to a widest scope consistent with the principles and novelty features disclosed herein.

The foregoing descriptions illustrate merely exemplary embodiments of the present invention, but are not intended to limit the embodiments of the present invention. Any variation, equivalent replacement, and improvement made within the spirit and principle of the embodiments of the present invention shall fall within the protection scope of the embodiments of the present invention.

What is claimed is:

1. A method for implementing multi-antenna transmission, comprising:
    setting, at a terminal, a group of low-correlation antennas and a group of high-correlation antennas used by the terminal, wherein a correlation between antennas in the group of low-correlation antennas is lower than a correlation between antennas in the group of high-correlation antennas, and wherein the antennas in the group of low-correlation antennas are different from the antennas in the group of high-correlation antennas such that each antenna in the group of low-correlation antennas is independent of each antenna in the group of high-correlation antennas;
    reporting, by the terminal, a reference signal to an evolved NodeB, wherein the reference signal is used by the evolved NodeB to determine a transfer mode;
    receiving, by the terminal, a response message carrying the transfer mode switching instruction fed back by the evolved NodeB; and
    extracting, by the terminal, the transfer mode switching instruction from the response message;
    wherein if the transfer mode switching instruction corresponds to a first transfer mode, then switching to the group of low-correlation antennas to transmit signals at the terminal; and if the transfer mode switching instruction corresponds to a second transfer mode, then switching to the group of high-correlation antennas to transmit signals at the terminal.

2. The method according to claim 1, wherein the antennas in the group of low-correlation antenna include at least one antenna that is different from the antennas in the group of high-correlation antennas.

3. The method according to claim 1, wherein the antennas in the group of low-correlation antennas adopt orthogonal polarization.

4. The method according to claim 1, wherein the antennas in the group of high-correlation antennas adopt vertical polarization.

5. A terminal for implementing multi-antenna transmission, comprising:
    a plurality of antennas divided into at least a group of low-correlation antennas and a group of high-correlation antennas used by the terminal, wherein a correlation between antennas in the group of low-correlation antennas is lower than a correlation between antennas in the group of high-correlation antennas, wherein the terminal is configured to report a reference signal to an evolved NodeB, and wherein the reference signal is used by the evolved NodeB to determine a transfer mode, and wherein the antennas in the group of low-correlation antennas are different from the antennas in the group of high-correlation antennas such that each antenna in the group of low-correlation antennas is independent of each antenna in the group of high-correlation antennas;

a receiving unit wireless transceiver configured to receive a response message carrying the transfer mode switching instruction fed back by the evolved NodeB; and a switching unit processor configured to extract the transfer mode switching instruction from the response message received by the receiving unit wireless transceiver;

wherein if the transfer mode switching instruction corresponds to a first transfer mode, then the switching unit processor is configured to switch to the group of low-correlation antennas to transmit signals at the terminal; and if the transfer mode switching instruction corresponds to a second transfer mode, then the switching unit processor is configured to switch to the group of high-correlation antennas to transmit signals at the terminal.

6. The terminal according to claim 5, wherein the antennas in the group of low-correlation antennas include at least one antenna that is different from the antennas in the group of high-correlation antennas.

7. The terminal according to claim 5, wherein the group of low-correlation antennas comprises at least two antennas, and the at least two antennas adopt orthogonal polarization.

8. The terminal according to claim 5, wherein the group of high-correlation antennas comprises at least two antennas, and the at least two antennas adopt vertical polarization.

* * * * *